US012705599B2

(12) United States Patent
Tharoor et al.

(10) Patent No.: US 12,705,599 B2
(45) Date of Patent: Aug. 11, 2026

(54) TRUSTED QR CODE GENERATION FOR FINANCIAL TRANSACTIONS

(71) Applicant: Visa International Service Association, San Francisco, CA (US)

(72) Inventors: Sandeep Tharoor, Palakkad (IN); Premvir Singh, Greater Noida (IN); Punniyakotti Sabapathy, Cheyyar (IN)

(73) Assignee: Visa International Service Association, San Francisco, CA (US)

(*) Notice: Subject to any disclaimer, the term of this patent is extended or adjusted under 35 U.S.C. 154(b) by 152 days.

(21) Appl. No.: 18/118,847

(22) Filed: Mar. 8, 2023

(65) Prior Publication Data

US 2024/0303627 A1 Sep. 12, 2024

(51) Int. Cl.

*G06Q 20/32* (2012.01)
*G06Q 20/38* (2012.01)
*G06Q 20/40* (2012.01)

(52) U.S. Cl.

CPC ... *G06Q 20/3276* (2013.01); *G06Q 20/38215* (2013.01); *G06Q 20/3825* (2013.01); *G06Q 20/3829* (2013.01); *G06Q 20/4014* (2013.01); *G06Q 2220/00* (2013.01)

(58) Field of Classification Search

CPC .............................................. G06Q 20/00–425
See application file for complete search history.

(56) References Cited

U.S. PATENT DOCUMENTS 9,213,930 B2 12/2015 Ibrahimbegovic et al.
9,646,303 B2 5/2017 Karpenko et al.
9,852,417 B2 * 12/2017 Tyler .................... G06Q 20/321

(Continued)

FOREIGN PATENT DOCUMENTS

WO 2022116734 A1 6/2022

OTHER PUBLICATIONS

Saumyabhatia, "QR Codes on Certificates: How to PreventCounterfeiting", Jul. 13, 2020, 11 pages.

(Continued)

*Primary Examiner* — Mohammad A. Nilforoush
(74) *Attorney, Agent, or Firm* — Buckley Patent Law LLC; Timothy Emmanuel Buckley

(57) ABSTRACT

In some embodiments, a computer-implemented method includes receiving, at an acquirer, a trust-verification-use-case-specific root certificate from a certificate authority of a payment processing network, the trust-verification-use-case-specific root certificate being associated with a trust verification use case; receiving an intermediate certificate from the certificate authority, the intermediate certificate being associated with the trust-verification-use-case-specific root certificate; generating, at the acquirer, a key pair for identity associated with an end-entity; signing the key pair for identity associated with the end-entity using the intermediate certificate; generating a digital certificate based upon the signing of the key pair for identity; generating a secure QR code utilizing the digital certificate, identify information associated with the end-entity, and an associated certificate chain; and providing the secure QR code to the end-entity for scanning by a user of a communication device to allow the user to provide financial compensation to the end-entity.

14 Claims, 4 Drawing Sheets

(56) References Cited

U.S. PATENT DOCUMENTS

| | | | | |
|---|---|---|---|---|
| 9,953,311 | B2 | 4/2018 | Flurscheim et al. | |
| 10,728,044 | B1 * | 7/2020 | Melo | H04L 9/0825 |
| 10,762,406 | B2 | 9/2020 | Singh et al. | |
| 10,817,954 | B2 | 10/2020 | Hurry | |
| 2007/0174198 | A1 | 7/2007 | Kasahara et al. | |
| 2015/0248664 | A1 * | 9/2015 | Makhdumi | G06Q 20/3274 235/380 |
| 2019/0156167 | A1 | 5/2019 | Singh et al. | |
| 2020/0274859 | A1 | 8/2020 | Melo et al. | |
| 2021/0044577 | A1 * | 2/2021 | Jung | H04L 9/3239 |

OTHER PUBLICATIONS

International Search Report and Written Opinion for Application No. PCT/US2024/018962 dated May 7, 2025 (12 pages).

* cited by examiner

TRUSTED QR CODE GENERATION FOR FINANCIAL TRANSACTIONS

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Many providers of content on internet content platforms have recently been utilizing quick response (QR) codes for online payment purposes. Because of the increased use of QR codes for payment purposes, nefarious actors have been developing techniques to circumvent security mechanisms embedded in the QR codes, thereby creating a lack of trust amongst users of the QR codes. Current QR code solutions display the corresponding QR codes on a content provider's website for the user of a smartphone to scan for payment, but often times the QR codes do not invoke the trust required by consumers to actually utilize the QR codes to make payments because of the increased security risks.

Thus, it is desirable to provide a payment environment that can improve transaction security for a user and provide the trust necessary for a consumer to utilize the QR codes for payment purposes.

DETAILED DESCRIPTION

Figure 1:
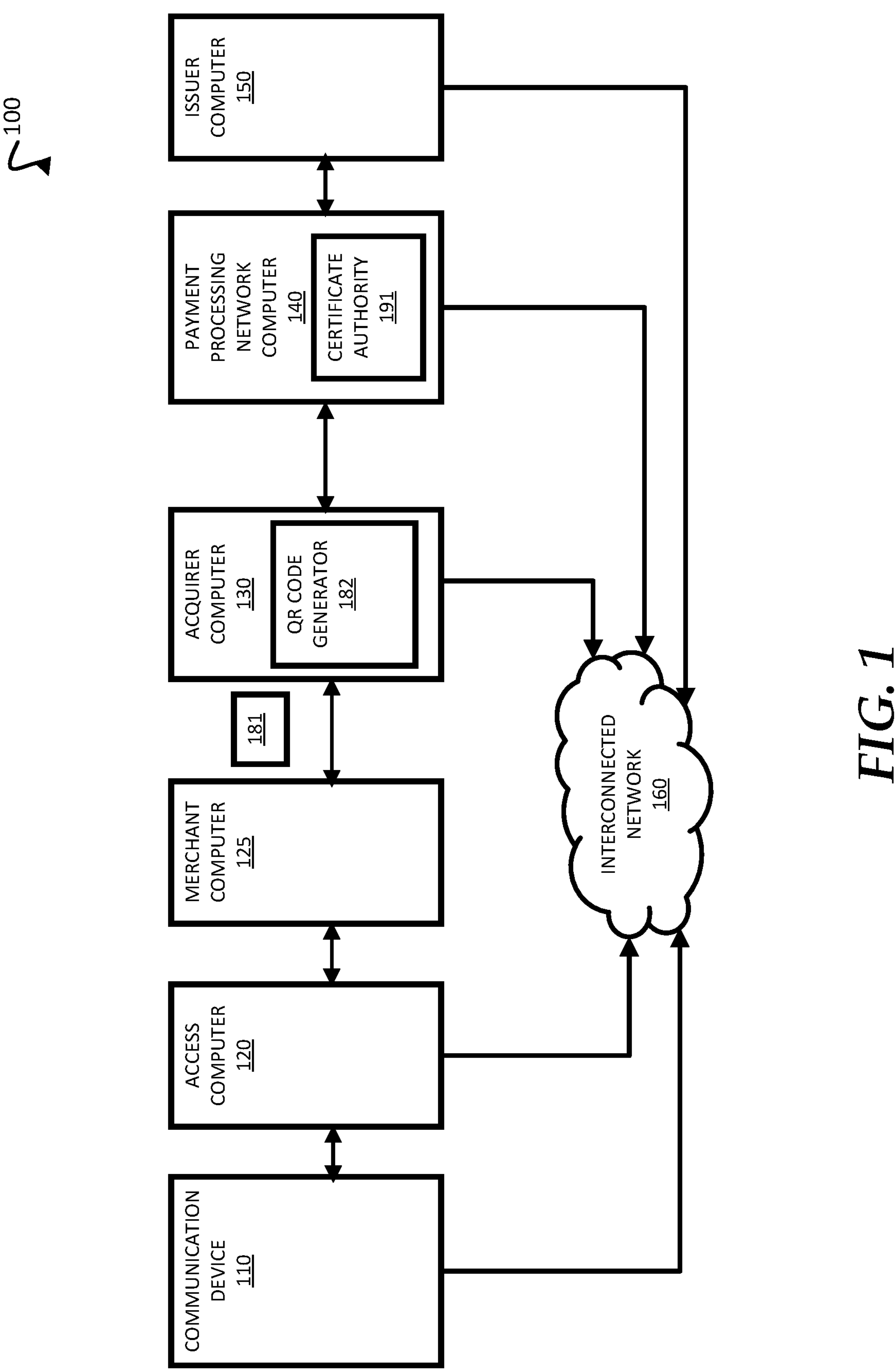
FIG. 1 illustrates a block diagram of a transaction processing system for electronic payment transactions in accordance with some embodiments.

A description of terms utilized in the description of all or some of the embodiments are described herein.

In some embodiments, the term "server computer" may include a computer or cluster of computers. For example, the server computer may be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

In some embodiments, the term "public/private key pair" may include a pair of linked cryptographic keys generated by an entity. In some embodiments, the public key may be used for public functions such as encrypting a message to send to the entity or for verifying a digital signature which was supposedly made by the entity. In some embodiments, the private key may be used for private functions such as decrypting a received message or applying a digital signature. In some embodiments, a public/private key pair may be referred to as a key pair for identity.

In some embodiments, the public key may be authorized by a body known as a certification authority (CA), which may store the public key in a database and distributes it to any other entity which requests it. In some embodiments, the certification authority may be included in a payment processing network. The private key may be kept in a secure storage medium and usually only be known to the entity. However, the cryptographic systems described herein may feature key recovery mechanisms for recovering lost keys and avoiding data loss.

In some embodiments, a "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

In some embodiments, a "certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate may be signed by a certificate authority.

In some embodiments, a "certificate authority" may include one or more server computers operatively coupled to issue certificates to entities. The certificate authority may prove its identity using a certificate authority certificate, which includes the public key of the certificate authority. The certificate authority certificate may be signed by another private key of the certificate authority or may be signed by the same private key of the certificate authority. The latter is known as a self-signed certificate. In some embodiments, the certificate authority may also maintain a database of all certificates issued by the certificate authority.

In some embodiments, the certificate authority may be configured to receive an unsigned certificate from an entity whose identity is known. In some embodiments, the unsigned certificate includes a public key, one or more data fields, and a hash of the data in the certificate. In some embodiments, the certificate authority signs the certificate with a private key corresponding to the public key included on the certificate authority certificate. In some embodiments, the certificate authority may then store the signed certificate in a database, and issue the signed certificate to the entity.

In some embodiments, a device may be configured with one or more "trusted root certificate authorities" (trusted root CAs). In some embodiments, a trusted root certificate authority is a certificate authority whose certificate is self-signed, and which a device trusts independently. Examples entities which operate trusted root certificate authorities may include Visa®, Mastercard®, Verisign®, and Thawte®.

In some embodiments, a certificate may be "verified" by verifying the signature of the certificate and verifying the certificate of the certificate authority that signed the certificate. In some embodiments, the signature of a certificate may be verified by decrypting the signature using the public key associated with the certificate authority. In some embodiments, the decrypted value is compared to an expected value based on the contents of the certificate. In some embodiments, if the values are the same, the signature is verified. In some embodiments, each subsequent certificate authority certificate is verified in a similar manner, until a trusted root certificate authority is reached, or until a certificate cannot be verified. In some embodiments, the sequence of certificates from a certificate to be verified to the trusted root certificate authority is known as a "certificate chain".

A "token" may include any identifier for a payment account that is a substitute for an account identifier. For example, a token may include a series of alphanumeric characters that may be used as a substitute for an original account identifier. For example, a token "4900 0000 0000 0001" may be used in place of a primary account identifier or primary account number (PAN) "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential may be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Authentication" is a process by which the credential of an endpoint (including but not limited to applications, people, devices, processes, and systems) can be verified to ensure that the endpoint is who they are declared to be.

An "original" transaction may include any transaction including an authorization provided by an issuer or an authorization provided on-behalf-of an issuer.

A "substitute" transaction may be any transaction that is associated with an original transaction and that takes place after the original transaction, including repeat, refunds, reversals or exceptions (chargebacks, re-presentments, etc.).

An "end-user" may include any application, device, consumer, or system that is configured to interact with a requestor for tokenization/de-tokenization/token management services. For example, an end-user may include a consumer, a merchant, a mobile device, or any other suitable entity that may be associated with a requestor in the network token system.

In some embodiments, a "consumer" may include an individual or a user that may be associated with one or more personal accounts, consumer devices, and/or communication devices. The consumer may also be referred to as a cardholder, accountholder, or user.

A "card-on-file (COF)" holder may include any entities that store account details (e.g., card details, payment account identifiers, PANs, etc.) for use in transactions. For example, a COF entity may store payment information on file for various types of periodic payments such as monthly utility payments, periodic shopping transactions, or any other periodic or future transaction. Because payment credentials and/or associated tokens are stored at an entity for a future transaction, the transactions initiated by a COF entity include card-not-present (CNP) transactions. Another type of card-not-present (CNP) transaction includes e-commerce or electronic commerce transactions that are initiated between remote parties (e.g., a consumer device and a merchant web server computer).

An "authorization request message" may be an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or a payment account. In some embodiments, an authorization request message may include a payment token, an expiration date, a token presentment mode, a token requestor identifier, an application cryptogram, and an assurance level data. The payment token may include a payment token issuer identifier that may be a substitute for a real issuer identifier for an issuer. For example, the real issuer identifier may be part of a BIN range associated with the issuer. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include an authorization code, which may be a code that a credit card issuing bank returns in response to an authorization request message in an electronic message (either directly or through the payment processing network). As noted above, in some embodiments, a payment processing network may generate or forward the authorization response message to the merchant.

In some embodiments, "machine readable code" can be any encoded image readable by a communication device or any other computing device. The machine readable code can be read by a device by, e.g., scanning the code with a camera device that is part of, or attached to, the device. Examples of machine readable code including quick response codes and SnapTags.

In some embodiments, a secure "quick response" code is a QR code generated utilizing embodiments described herein. In some embodiments, the secure QR code may include a matrix barcode and a type of machine readable code that includes information generated utilizing embodiments described herein.

A "cryptogram" may be a uniquely signed digital payload associated with a primary account number (PAN) or token. The cryptogram may uniquely identify the device that emulated the payment card and is a form of validation. The cryptogram may be uniquely generated for every payment transaction.

In some embodiments, "financial credentials" may include a PAN, token, or any other representation that identifies a payment account associated with a user.

A "secure element" can be a dynamic environment in which application code and application data can be securely stored and administered and which secure execution of applications occur. The secure element can reside in highly secure crypto chips. The financial credentials can be stored within the secure element.

In some embodiments, an "access computer" may be a computer that enables a customer to access the secure QR code 181 to make a payment to, for example, a merchant or content provider, in exchange for goods or services. In some embodiments, an access computer may include hardware, software, or a combination thereof, used to display the secure QR code 181 that may be scanned by a user of a communication device 110 to initiate a transfer of funds from the user to a banking account associated with the merchant or end-entity, such as, for example, a provider of content on a content platform.

In some embodiments, an end-entity is an entity (e.g., an organization or person) that is the ultimate recipient of a payment or transfer of funds (e.g., the content provider receiving a donation or payment for the content being provided on a content platform from a user of the communication device 110). In some embodiments, the end-entity may be considered a final link in the chain of transactions performed utilizing the transaction processing system 100.

In some embodiments, a "digital wallet provider" may include any suitable entity that provides a digital wallet service. A digital wallet provider may provide software applications that store account numbers, account numbers including unique identifiers, or representations of the account numbers (e.g., tokens), on behalf of an account holder to facilitate payments at more than one unrelated merchant, perform person-to-person payments, or load financial value into the digital wallet.

"Contactless" or "wireless" can include any communication method or protocol, including proprietary protocols, in which data is exchanged between two devices without the need for the two devices to be physically coupled. For example, "contactless" or "wireless" can include radio frequency (RF), infrared, laser, or any other communication means, and the use of any protocols, such as proprietary protocols, with such communication means.

FIG. 1 illustrates a block diagram of a transaction processing system 100 in accordance with some embodiments. In some embodiments, the transaction processing system 100 is configured to generate a secure QR code 181 for secured payment transactions between a user of communication device 110 and a merchant or content provider. For example, in some embodiments, the secure QR code 181 is generated by acquirer computer 130 (utilizing an intermediate certificate generated by a certification authority) and provided to merchant computer 125 (e.g., a content provider). In some embodiments, the merchant computer 125 embeds the secure QR code 181 into content provided by the content provider on a viewing platform of access computer 120. In some embodiments, the access computer 120 may be a computer utilized by the user of the communication device 110 (e.g., the viewer) to access content generated by the content provider and the secure QR code 181 generated by acquirer computer 130. In some embodiments, the viewer of the content provided by the content provider may scan the secure QR code 181 generated by the acquirer computer 130 for payment purposes and trust that a payment provided to the content provider utilizing the secure QR code 181 is secure and trustworthy.

In some embodiments, the transaction processing system 100 may include a communication device 110, an access computer 120, a merchant computer 125, an acquirer computer 130, a payment processing network computer 140 and an issuer computer 150. In some implementations, different entities in FIG. 1 may communicate with each other using one or more communication networks such as the Internet, a cellular network, a TCP/IP network or any other suitable communication network. Note that one or more entities in the transaction processing system 100 may be associated with a computer apparatus that may be implemented using some of the components described herein.

In some embodiments, the communication device 110 may be associated with a payment account of a user of the communication device 110. In some embodiments, the communication device 110 may be a mobile device, such as a mobile phone, a tablet, a PDA, a notebook, a key fob, a mobile watch, or any suitable mobile device. For example, the communication device 110 may include a wallet or a payment application that may be associated with one or more payment accounts of the user. In some implementations, the communication device 110 may be configured to display a machine readable code, such as, for example, secure QR code 181. In some embodiments, the communication device 110 may also include a camera or a scanning device capable of scanning machine readable code. In some embodiments, the communication device 110 is configured to scan a secure QR code 181 displayed on, for example, access computer 120. In some implementations, the communication device 110 may be capable of communicating with the access computer 120 via the internet. In some implementations, the communication device 110 may be associated with a payment card such as a credit card, debit card, prepaid card, loyalty card, gift card, etc.

In some implementations, the access computer 120 may be a personal computer that may be used by the user to initiate a transaction with the merchant computer 125 (e.g., an online transaction). In some implementations, the access computer 120 may be configured to display transaction information in a format that may be read by the communication device 110 (e.g., mobile phone) including, for example, the secure QR code 181. In some embodiments, the access computer 120 is a computer used by the user of communication device 110 to access content provided by the content provider (e.g., a merchant) and the secure QR code 181 generated by the acquirer computer 130.

In some embodiments, the merchant computer 125 may be associated with a merchant that may be an end-entity. In some embodiments, a merchant may be, for example, a content provider of content services provided via an online content platform. In some embodiments, the merchant computer 125 may be associated with a card-on-file (COF) merchant. For example, the card-on-file merchant may store consumer account information on file (e.g., at a merchant database) for future payment purposes such as various types of periodic payments (e.g., monthly utilities payments). In some implementations, a consumer may register with one or more merchants for card-on-file services. The merchant computer 125 may be configured to generate an authorization request for a transaction initiated by the user using the secure QR code 181 displayed on the access computer 120.

In some embodiments, the acquirer computer 130 may represent an acquirer/acquirer processor and is configured to generate the secure QR code 181. In some embodiments, the acquirer computer 130 is a system for an entity (e.g., a bank) that has a business relationship with a particular merchant (e.g., the content provider), a wallet provider or another entity. In some embodiments, the acquirer computer 130 may be communicatively coupled to the merchant computer 125 and the payment processing network computer 140 and may issue and manage a financial account for the merchant or content provider. In some embodiments, the acquirer computer 130 may be configured to route the authorization request for a transaction to the issuer computer 150 via the payment processing network computer 140 and route an authorization response received via the payment processing network computer 140 to the merchant computer 125.

In some embodiments, the payment processing network computer 140 may be configured to provide authorization services, and clearing and settlement services for payment transactions. In some embodiments, the payment processing network computer 140 may include data processing subsystems, wired or wireless networks, including the internet. An example of the payment processing network computer 140 includes VisaNet™, operated by Visa®. Payment processing networks, such as, for example, VisaNet™ are configured to process credit card transactions, debit card transactions, and other types of commercial transactions. VisaNet™, in particular includes a Visa Integrated Payments (VIP) system which processes authorization requests and a Base II system which performs clearing and settlement services. The payment processing network computer 140 may include a server computer. In some implementations, the payment processing network computer 140 may forward an authorization request received from the acquirer computer 130 to the issuer computer 150 via a communication channel. In some embodiments, the payment processing network computer 140 may further forward an authorization response message received from the issuer computer 150 to the acquirer computer 130. In some embodiments, the payment processing network computer 140 may include the certificate authority, where the certificate authority is configured to generate a root certificate, an intermediate certificate, etc., requested by acquirer computer 130.

In some embodiments, the issuer computer 150 may represent an account issuer and/or an issuer processor. In some embodiments, the issuer computer 150 may be associated with a business entity (e.g., a bank) that may have issued an account and/or payment card (e.g., credit account, debit account, etc.) for payment transactions. In some implementations, the business entity (bank) associated with the issuer computer 150 may also function as an acquirer (e.g., the acquirer computer 130).

In some embodiments, the transaction processing system 100 may include an acquire intermediary (e.g., an acquire intermediary computer), located between acquirer computer 130 and merchant computer 125. In some embodiments, the acquire intermediary computer is configured to generate contextual identity information on behalf of the acquirer computer 130 and ensure that an appropriate signing process is followed. In some embodiments, the contextual identity information is information added to the secure QR code 181 to give additional context to the identity information.

The various entities in the transaction processing system 100 may communicate with each other via an interconnected network 160, e.g., the Internet.

Figure 2:
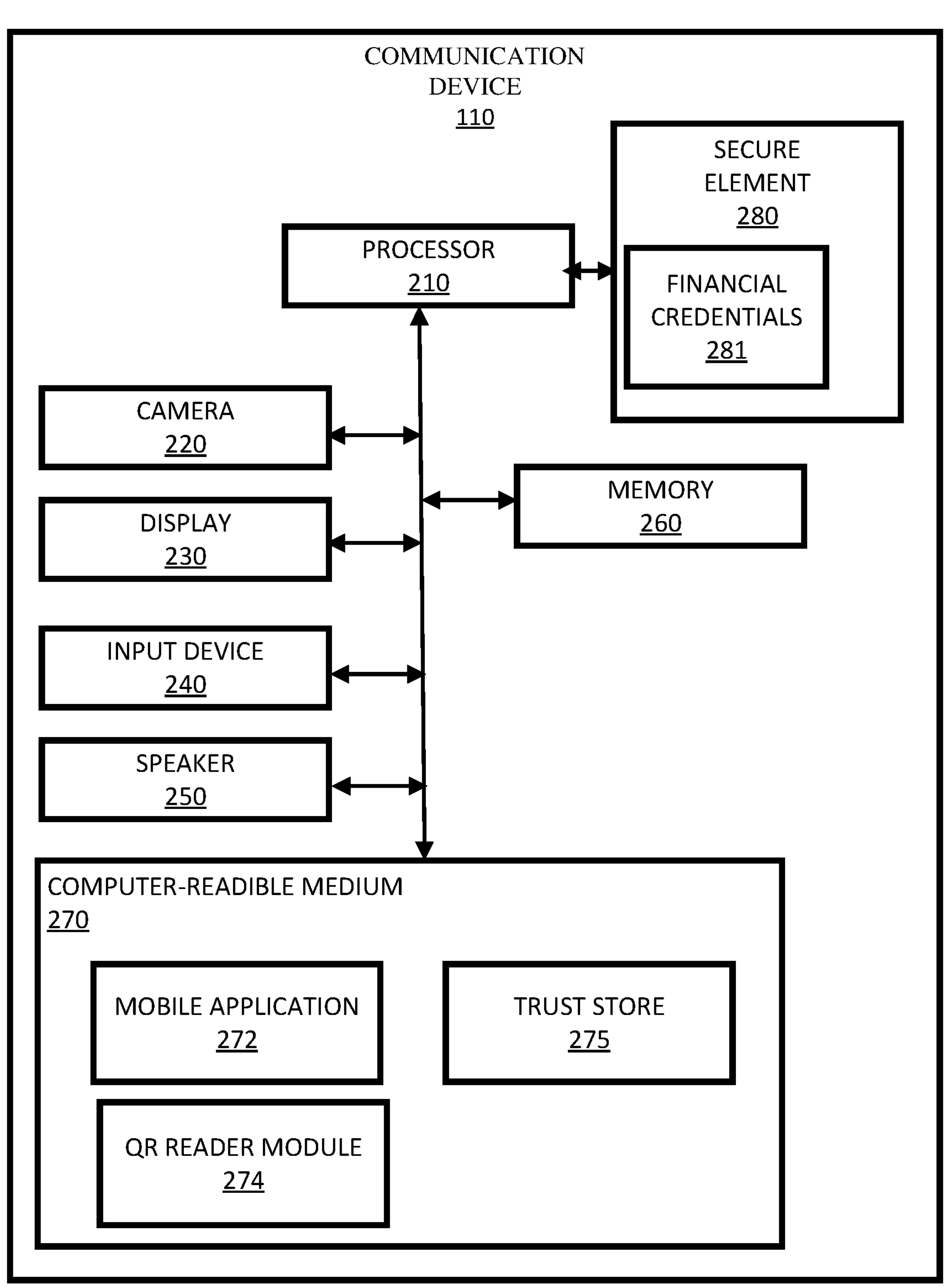
FIG. 2 illustrates a block diagram of a communication device utilized in the transaction processing system of FIG. 1 in accordance with some embodiments.

FIG. 2 illustrates a block diagram of communication device 110, in accordance with some embodiments. In some embodiments, communication device 110 includes a processor 210, a camera 220, a display 230, an input device 240, a speaker 250, a memory 260, a computer-readable medium 270, and a secure element 280. In some embodiments, the computer-readable medium includes a mobile application 272, a QR reader module 274, and a trust store 275.

In some embodiments, trust store 275 refers to a repository of trusted certificate authorities that is used by communication device 110 to verify the authenticity of digital certificates associated with merchants, payment gateways, or other entities involved in online transactions with communication device 110. In some embodiments, trust store 275 may include the public keys of the trusted certificate authorities and may be used by clients (such as web browsers or payment applications) to verify the identity of servers. In some embodiments, the trust store 275 includes the root certificates and intermediate certificates of trusted certificate authorities that are authorized to issue digital certificates for merchants, payment gateways, and other entities involved in a transaction. In some embodiments, the trust store 275 may be used by the QR code scanning application (e.g., QR reader module 274) to verify the authenticity of a certificate a when establishing a secure connection with the payment gateway in transaction processing system 100. In some embodiments, by including trust store 275 in communication device 110, the QR reader module 274 may ensure that a payment transaction is secure and that the payment information is transmitted over an encrypted connection.

Processor 210 may be any suitable processor operable to carry out instructions on the communication device 110. The processor 210 is coupled to other units of the communication device 110 including camera 220, display 230, input device 240, speaker 250, memory 260, and computer-readable medium 270.

Camera 220 may be configured to capture one or more images via a lens located on the body of communication device 110. The captured images may be still images or video images. The camera 220 may include a CMOS image sensor to capture the images. Various applications (e.g., mobile application 272) running on processor 210 may have access to camera 220 to capture images. It can be appreciated that camera 220 can continuously capture images without the images actually being stored within communication device 110. Captured images may also be referred to as image frames. In some embodiments, camera 220 may be configured to capture images of a machine readable code, such as, for example, secure QR code 181.

Display 230 may be any device that displays information to a user. Examples may include an LCD screen, CRT monitor, or seven-segment display.

Input device 240 may be any device that accepts input from a user. Examples may include a keyboard, keypad, mouse, or microphone. In the case of a microphone, the microphone may be any device that converts sound to an electric signal. In some embodiments, the microphone may be used to capture one or more voice segments from a user.

Speaker 250 may be any device that outputs sound to a user. Examples may include a built-in speaker or any other device that produces sound in response to an electrical audio signal. In some embodiments, speaker 250 may be used to request the user for a voice sample for purposes of authentication.

Memory 260 may be any magnetic, electronic, or optical memory. It can be appreciated that memory 260 may include any number of memory modules. An example of memory 260 may be dynamic random access memory (DRAM).

Computer-readable medium 270 may be any magnetic, electronic, optical, or other computer-readable storage medium. Computer-readable medium 270 may comprise any combination of volatile and/or non-volatile memory such as, for example, buffer memory, RAM, DRAM, ROM, flash, or any other suitable memory device, alone or in combination with other data storage devices.

Secure element 280 may be a secure, tamper-resistant, storage and execution environment that various payment assets such as financial credentials 281. The secure element 280 can act as a contactless front end by using a communication channel with the mobile application 272. The secure element 280 may be composed of a combination of an integrated circuit and an operating system. The secure element 280 may also contain a secure applet that may be selected by the access computer 120 and presents any available mobile contactless payment information to the access computer 120.

In some embodiments, mobile application 272 may be an application executable by processor 210 on the communication device 110. In some embodiments, the mobile application 272 may be a secure application for facilitating payment transactions using the communication device 110. For example, the mobile application 272 can be a digital wallet application. The mobile application 272 may interface with the secure element 280 to obtain the financial credentials 281 associated with the user. In some embodiments, the mobile application 272 may contain, but is not limited to, the following core pieces: (1) a payment library including code for enabling payments including selecting and presenting the secure element 280 to the access computer 120; (2) a proxy applet managed by a service provider that manages secure communications between the secure element 280 and a trusted service manager to execute account provisioning and account management commands; and (3) a contactless gateway library that includes code for enabling secure communication between the secure element 10(*b*) and a payment processor's contactless gateway.

In some embodiments, QR reader module 274 may be configured to read and interpret a secure QR code 181. In some embodiments, the QR reader module 274 may interface with camera 220 to capture or "scan" secure QR code 181 from, for example, an access computer 120. In some embodiments, upon capturing or scanning the secure QR code 181, the QR reader module 274 may interpret the secure QR code 181 and convert the secure QR code 181 to information required to perform financial transactions. For example, the QR reader module 274 may interpret the secure QR code 181 scanned off an access computer 120 and determine the relevant transaction information associated with the transaction (e.g., payment amount, merchant information, coupon information, random number, etc.). In some embodiments, the QR reader module 274 is configured to ensure validation certificates are updated in trust store 275. In some embodiments, QR reader module 274 is configured to validate identity content using a public key certificate chain. In some embodiments, QR reader module 274 is configured to download an update certificates or trust certificates generated utilizing the embodiments described herein.

Figure 3:
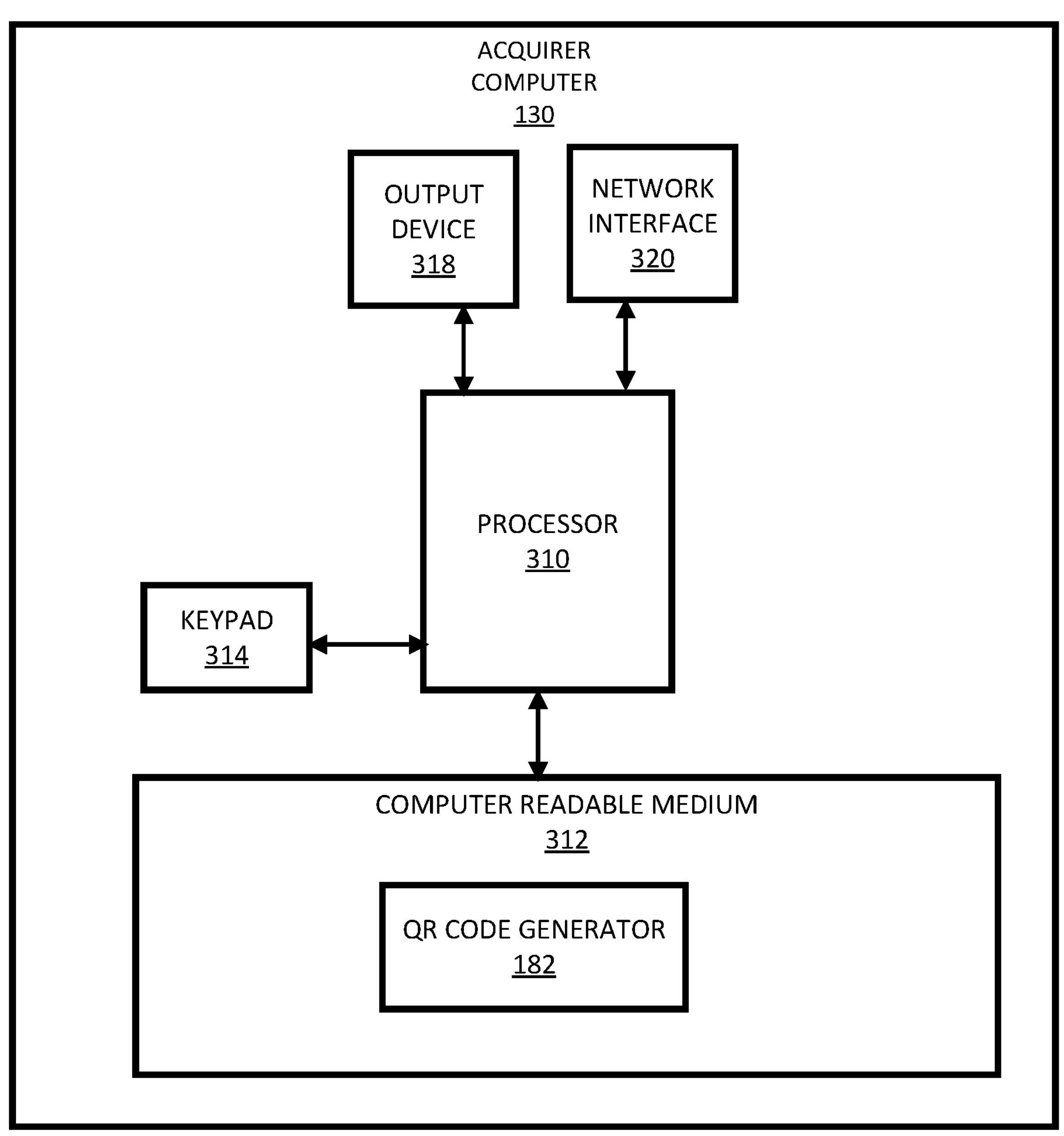
FIG. 3 illustrates a block diagram of an acquirer computer utilized to generate a secure quick response (QR) code utilized for electronic payment transactions in the transaction processing system of FIG. 1 in accordance with some embodiments.

FIG. 3 illustrates a block diagram of an acquirer computer 130, in accordance with some embodiments. In some embodiments, acquirer computer 130 may include a processor 310, computer-readable medium 312, a keypad 314, an output device 318, and a network interface 320. All of these elements may be operatively coupled to processor 310. In some embodiments, the acquirer computer 130 is configured to utilize the secure QR code generation method 400 to generate the secure QR code 181 for trusted payment processing utilizing transaction processing system 100, as described herein with reference to FIG. 4.

Computer-readable medium 312 may include one or more memory chips, disk drives, etc. Computer-readable medium 312 may store code or instructions for the embodiments described herein. The instructions may be executed by processor 310. The computer-readable medium 312 may include one or more memory chips, disk drives, etc. Computer-readable medium 312 may store code or instructions configured to allow acquirer computer 130 to operate in the manner described herein. The instructions may be executed by processor 310. Computer-readable medium 312 may further comprise any suitable modules.

In some embodiments, computer-readable medium 312 includes QR code generator 182. In some embodiments, the QR code generator 182 is executable code or equivalent hardware configured to generate secure QR code 181. In some embodiments, the QR code generator 182 is configured to utilize the secure QR code generation method 400 described herein with reference to FIG. 4 to generate the secure QR code 181. In some embodiments, the secure QR code 181 may be generated by the QR code generator 182 and provided to merchant computer 125 for display on access computer 120 or communication device 110. In some embodiments, the displayed secure QR code 181 may be read or "scanned" by communication device 110.

Keypad 314 may be operable to input information such as transaction information into acquirer computer 130. Network interface 320 may be operable to enable acquirer computer 130 to communicate with other system entities. For example, it may enable acquirer computer 130 to communicate with one or more of acquirer computer 130, payment processing network computer 140, and issuer computer 150.

Figure 4:
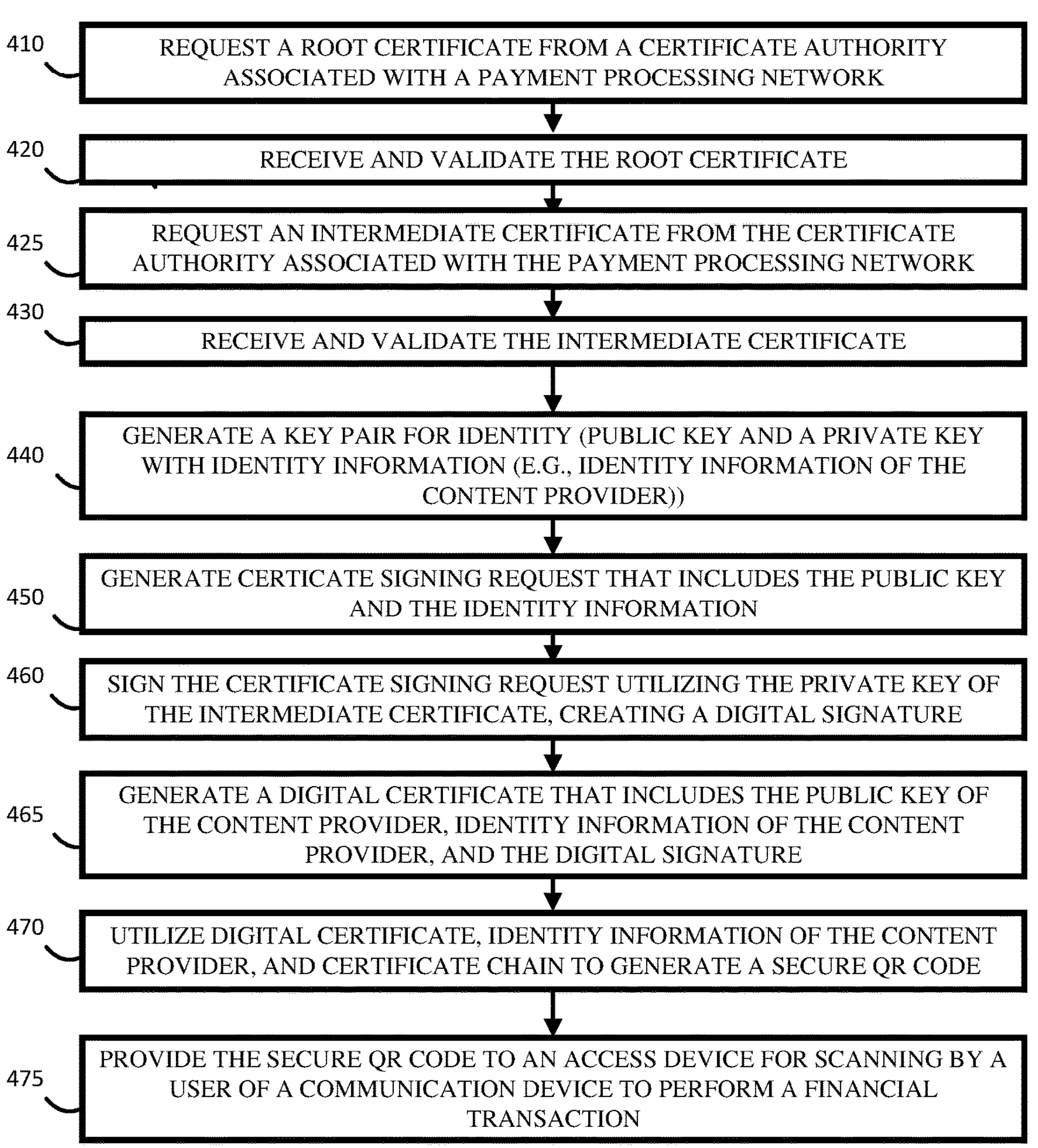
FIG. 4 is a flow diagram illustrating a secure quick response (QR) code generation method utilized to generate the secure QR code of FIG. 3 in accordance with some embodiments.

FIG. 4 is a flow diagram illustrating a secure QR code generation method 400 in accordance with some embodiments. In some embodiments, the secure QR code generation method 400 is utilized by acquirer computer 130 to generate a secure QR code 181 that is configured to provide a trusted and secure method of payment in the transaction processing system 100. For example, a viewer of content on a content platform may utilize the secure QR code 181 as a trustworthy method of providing monetary compensation to a creator of content on the content platform. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, the secure QR code generation method 400 is described with reference to the figures described herein.

In some embodiments, in order to commence the process of generating the secure QR code 181, at operation 410, the acquirer computer 130 submits a root certificate signing request to a certification authority 191 associated with the payment processing network computer 140. In some embodiments, acquirer computer 130 is configured to generate the secure QR code 181 utilizing QR code generator 182 and may represent a system for an entity (e.g., a bank) that has a business relationship with a particular merchant (e.g., the content provider). In some embodiments, the root certificate signing request is a request submitted by acquirer computer 130 to certification authority 191 to obtain a root certificate. In some embodiments, the root certificate is a digital certificate issued by the certificate authority 191 that is configured to establish trust between the entity requesting the root certificate and the certification authority and may also be utilized to sign other certificates. In some embodiments, the root certificate may be used to establish secure communication and authentication between entities communicating with the payment processing network computer 140. In some embodiments, the root certificate includes information about the certificate authority, including the name, address, and country of the certificate authority, as well as a public key and a digital signature. In some embodiments, the digital signature is used to verify the authenticity of the certificate and to ensure that it has not been altered. In some embodiments, the root certificate serves as the foundation of trust for the entire certificate chain and is used to verify the authenticity of all subsequent certificates issued by the certificate authority.

In some embodiments, the root certificate signing request includes information about the entity that is requesting the root certificate (e.g., the acquirer computer 130), such as its distinguished name (DN), public key, signature algorithm, and other optional attributes. In some embodiments, an intermediate certificate linked to the root certificate is also generated by the certificate authority 191 and is utilized by acquirer computer 130 to generate the secure QR code 181 (discussed further in detail herein). In some embodiments, the root certificate signing request may be generated by web server software of acquirer computer 130 and provided to certification authority 191 for verification and issuance of the root certificate.

In some embodiments, the root certificate signing request submitted to the certificate authority 191 may be associated with a particular "trust verification use case". In some embodiments, a "trust verification use case" refers to a scenario in which an entity (e.g., acquirer computer 130), seeks to establish trust with another entity (e.g., payment processing network computer 140) in a secure communication environment. Trust verification may be accomplished through the use of digital certificates and public key infrastructure (PKI). An example of a trust verification use case in the context of financial transactions includes, when a processing system verifies the validity and security of the parties, connections, and accounts involved in a financial transaction.

In some embodiments, certificate authority 191 of payment processing network computer 140 receives the root certificate request from acquirer computer 130 and commences the process of verifying the identity of the acquirer computer 130. In some embodiments, payment processing network computer 140 verifies the identity of the acquirer computer 130 by performing a security assessment of the acquirer computer 130 to ensure the compliance of acquirer computer 130 with the security and operational requirements of the payment processing network computer 140. In some embodiments, after the acquirer computer 130 is approved by the payment processing network computer 140, the payment processing network computer 140 provides the root certificate to acquirer computer 130.

In some embodiments, at operation 420, the acquirer computer 130 receives the root certificate from the certificate authority 191 of payment processing network computer 140 and validates the root certificate. In some embodiments, acquirer computer 130 is configured to validate the root certificate by checking if the root certificate is signed by a certificate authority that is trusted and if the root certificate is included in the list of trusted root certificates maintained by the payment processing network computer 140. In some embodiments, acquirer computer 130 may also verify the expiration date of the root certificate, the serial number of the root certificate, and the chain of trust associated with the root certificate to ensure that the root certificate is authentic and has not been tampered with. In some embodiments, if the root certificate passes these checks, the acquirer computer 130 deems the root certificate as trustworthy and genuine and may be used to securely communicate with the issuing entity. In some embodiments, after the root certificate is validated, acquirer computer 130 installs the root certificate onto acquirer computer 130.

In some embodiments, at operation 425, after the root certificate has been installed on acquirer computer 130, acquirer computer 130 requests an intermediate certificate from the certificate authority 191 of payment processing network computer 140. In some embodiments, the intermediate certificate is a digital certificate issued by the certificate authority 191 that links the root certificate to another certificate, such as, an end-entity certificate, and is utilized by acquirer computer 130 to generate the secure QR code 181. In some embodiments, the intermediate certificate includes the following information: the issuer (e.g., the name of the certificate authority that issued the intermediate certificate), the subject (e.g., the name of the entity that the certificate represents, which may be a domain name or an organization name), the public key (the public key that is used to encrypt information and verify digital signatures), the signature algorithm (e.g., the algorithm used to sign the intermediate certificate, such as SHA-256 or RSA), the validity period (e.g., the start and end dates during which the certificate is considered valid), the serial number (e.g., a unique identifier for the certificate), extensions (e.g., additional information that may be included in the certificate, such as the purpose of the certificate and the key usage), and the certificate chain (e.g., a list of certificate authorities that the intermediate certificate is linked to, starting with the root certificate and ending with the intermediate certificate). In some embodiments, the information included in the intermediate certificate may be used by acquirer computer 130 to verify the authenticity and integrity of the certificate, establish a secure communication channel with the entity represented by the certificate, and ensure that the payment processing system is secure and protected against fraud.

In some embodiments, an end-entity is an entity (e.g., an organization or person) that is the ultimate recipient of a payment or transfer of funds (e.g., the content provider or bank of content provider receiving a donation or payment for the content being provided on a content platform from a user of the communication device 110). In some embodiments, the end-entity may be considered a final link in the chain of transactions performed utilizing the transaction processing system 100.

In some embodiments, after receiving the intermediate certificate request from acquirer computer 130, the certificate authority 191 of payment processing network computer 140 generates the intermediate certificate and provides the intermediate certificate to acquirer computer 130.

In some embodiments, at operation 430, acquirer computer 130 receives the intermediate certificate from the certificate authority 191 and validates the intermediate certificate to ensure the intermediate certificate is legitimate and has not been revoked. In some embodiments, the acquirer computer 130 validates the intermediate certificate by checking the intermediate certificate against, for example, trusted root certificates stored at the acquirer computer 130. In some embodiments, the validation process may involve verifying the digital signature of the intermediate certificate to ensure the signature has not been tampered with or altered in any way; verifying that the certificate is part of a trusted chain of certificates (verifying the chain of trust), starting with a trusted root certificate and ending with the intermediate certificate; determining whether the intermediate certificate has been revoked by the certificate authority 191 that issued the intermediate certificate (by checking the certificate revocation list of the certificate authority or by using an online revocation checking service provided by the certificate authority); and checking that the intermediate certificate is not expired and remains valid for the time period specified in the certificate. By verifying the signature, chain of trust, revocation status, and expiration date, the acquirer computer 130 ensures that the intermediate certificate is valid and can be trusted for secure communication with the payment processing network computer 140.

In some embodiments, after validating the intermediate certificate, the acquirer computer 130 installs the intermediate certificate in acquirer computer 130 (e.g., in the trust store of the web server or application server). In some embodiments, after installing the intermediate certificate, the acquirer computer 130 configures the acquirer computer 130 to use the intermediate certificate for communicating with the payment processing network computer 140, as well as for using the intermediate certificate to sign the key pair for identity to generate the secure QR code 181, described further in detail herein. In some embodiments, configuring the acquirer computer 130 may include specifying the trust chain of the intermediate certificate or setting up a secure socket layer (SSL) connection. In some embodiments, the acquirer computer 130 tests the setup to ensure that communication between their systems and the payment processing network computer 140 is secure and functioning correctly. In some embodiments, the acquirer computer 130 monitors the use of the certificate to ensure that the intermediate certificate remains valid and has not been revoked. In some embodiments, the monitoring of the intermediate certificate involves regular confirmation checks with the payment processing network computer 140 or using a certificate authority's online revocation checking services.

In some embodiments, at operation 440, an acquirer computer 130 generates a key pair for identity (e.g., public key and a private key pair with identity information) associated with the end-entity (e.g., merchant computer 125 or a content provider seeking payment for content rendered). In some embodiments, the key pair for identity includes a public key, a private key, and identity information associated with an end-entity that conforms to a Public Key Infrastructure (PKI) protocol. In some embodiments, the identity information includes information associated with the end-entity (e.g., identity information of the merchant or content provider). In some embodiments, the PKI is a protocol that requires the generator of the public key and private key pair with identity information to conform to PKI specific series of rules and regulations when generating the public key and the private key.

In some embodiments, after acquirer computer 130 generates the public key and private key pair, along with the identity information of the end-entity (e.g., the identity information of the content provider), at operation 450, the acquirer computer 130 generates a certificate signing request that is used in the generation of a digital certificate. In some embodiments, the certificate signing request includes the public key and identity information of the end-entity. In some embodiments, the identity information of the end-entity includes information, such as, for example, the domain name, organization name, and location of the end-entity. In some embodiments, after generating the certificate signing request for use in generation of a digital certificate, operation 450 proceeds to operation 460.

In some embodiments, at operation 460, after generating the certificate signing request, the acquirer computer 130 utilizes the private key of the intermediate certificate to sign the certificate signing request, creating a digital signature. For example, the private key of the intermediate certificate is used to generate a digital signature on the certificate signing request, which acts as an electronic fingerprint. In some embodiments, after the private key of the intermediate certificate is used to sign the certificate signing request, operation 460 proceeds to operation 465.

In some embodiments, at operation 465, the acquirer computer 130 generates a digital certificate that includes the public key of the end-entity, identity information of the end-entity, and the digital signature. In some embodiments, the digital certificate may be created using the public key of the end-entity, identity information of the end-entity, and the digital signature of the certificate signing request by, for example, verifying the digital signature of the certificate signing request using the public key of the intermediate certificate, extracting the public key of the end-entity from the verified certificate signing request, extracting the identity information of the end-entity from the verified certificate signing request, combining the extracted public key, identity information, and additional information such as the validity period, subject name, etc., and signing the digital certificate using the private key of the intermediate certificate. In some embodiments, the resulting digital certificate may be used to verify the identity of the end-entity. In some embodiments, after the digital certificate is generated by the acquirer computer 130, operation 465 proceeds to operation 470.

In some embodiments, at operation 470, by request from the end-entity (e.g., the content creator, the payee, or merchant), the acquirer computer 130 generates the secure QR code 181. In some embodiments, the acquirer computer 130 generates the secure QR code 181 by embedding the digital certificate, the identity information or content, and the certificate chain in the secure QR code 181. In some embodiments, acquirer computer 130 uses the unique identifier of the end-entity located in the digital certificate to generate a visual representation of the verification of the end-entity (e.g., an end-entity based visual representation) and embed the visual representation of the end-entity being verified by the payment processing network computer 140 on the secure QR code 181. For example, if the end-entity is Buckley Enterprises, the end-entity based visual representation of the end-entity is generated by acquirer computer 130 using the unique identifier and embedded in the secure QR code 181, which may state, for example, "Buckley Enterprises has been Verified By VISA". In some embodiments, utilizing the secure QR code generation method 400 and the embodiments described herein, trust is established between, for example, the consumer paying the end-entity for content and the end-entity. In some embodiments, the resulting secure QR code 181 is a secure QR code that may be trusted by the user of the communication device 110.

In some embodiments, at operation 475, acquirer computer 130 provides the secure QR code 181 to the end-entity (e.g., merchant computer 125). In some embodiments, the merchant computer 125 embeds or places the secure QR code 181 on the content provided to the access computer 120 for display on the access computer 120.

In some embodiments, user of communication device 110 views secure QR code 181 with the verification by payment processing network computer 140 visual representation in the secure QR code 181 and scans the secure QR code 181 to pay the end-entity. In some embodiments, because secure QR code 181 is a secure QR code, the user trusts the secure QR code 181 and provides the payment (or donation) to the end-entity using the secure QR code 181.

In some embodiments, the QR code may be, for example, an offline sticker on a paper on a physical merchant store (which when generated, for example, may be signed and forms a trusted credential).

In some embodiments, a computer-implemented method, includes receiving, at an acquirer, a trust-verification-use-case-specific root certificate from a certificate authority of a payment processing network, the trust-verification-use-case-specific root certificate being associated with a trust verification use case; receiving, at the acquirer, an intermediate certificate from the certificate authority, the intermediate certificate being associated with the trust-verification-use-case-specific root certificate; generating, at the acquirer, a key pair for identity associated with an end-entity; signing the key pair for identity associated with the end-entity using the intermediate certificate; generating a digital certificate based upon the signing of the key pair for identity; generating a secure quick response (QR) code utilizing the digital certificate, identify information associated with the end-entity, and an associated certificate chain; and providing the secure QR code to the end-entity for scanning by a user of a communication device to allow the user to provide financial compensation to the end-entity.

In some embodiments, the computer-implemented method further includes generating, at the acquirer, a certificate signing request to sign the key pair for identity.

In some embodiments, the computer-implemented method further includes signing the certificate signing request utilizing an intermediate certificate private key of the intermediate certificate.

In some embodiments, the computer-implemented method further includes signing the certificate signing request creates a digital signature.

In some embodiments of the computer-implemented method, the key pair for identity includes a public key and private key with identify information associated with the end-entity.

In some embodiments of the computer-implemented method, the digital certificate includes the public key of the end-entity, identity information of the end-entity, and the digital signature.

In some embodiments of the computer-implemented method, the associated certificate chain includes the trust-verification-use-case-specific root certificate and the intermediate certificate.

In some embodiments of the computer-implemented method, the end-entity is a content provider.

In some embodiments, a system includes a processor; and a non-transitory computer readable medium coupled to the processor, the non-transitory computer readable medium including code that: receives a trust-verification-use-case-specific root certificate from a certificate authority of a payment processing network, the trust-verification-use-case-specific root certificate being associated with a trust verification use case; receives an intermediate certificate from the certificate authority, the intermediate certificate being associated with the trust-verification-use-case-specific root certificate; generates a key pair for identity associated with an end-entity; signs the key pair for identity associated with the end-entity using the intermediate certificate; generates a digital certificate based upon the signing of the key pair for identity; generates a secure quick response (QR) code utilizing the digital certificate, identify information associated with the end-entity, and an associated certificate chain; and provides the secure QR code to the end-entity for scanning by a user of a communication device to allow the user to provide financial compensation to the end-entity.

In some embodiments of the system, the code generates a certificate signing request to sign the key pair for identity.

In some embodiments of the system, the code utilizes an intermediate certificate private key of the intermediate certificate to sign the certificate signing request.

In some embodiments of the system, signing the certificate signing request creates a digital signature.

In some embodiments of the system, the key pair for identity includes a public key and private key with identify information associated with the end-entity.

In some embodiments of the system, the digital certificate includes the public key of the end-entity, identity information of the end-entity, and the digital signature.

In some embodiments of the system, the associated certificate chain includes the trust-verification-use-case-specific root certificate and the intermediate certificate.

In some embodiments of the system, the end-entity is a content provider.

In some embodiments, a communication device includes a scanning device; and a mobile application coupled to receive a secure quick response (QR) code scanned by the scanning device, wherein the secure QR code is generated based upon a signing of a key pair for identity by an intermediate certificate, the key pair for identity being associated with an end-entity and the intermediate certificate being linked to a trust-verification-use-case-specific root certificate.

In some embodiments of the communication device, the key pair for identity includes a public key and private key with identify information associated with the end-entity.

In some embodiments of the communication device, a certificate signing request is utilized to sign the key pair for identity.

In some embodiments of the communication device, an intermediate certificate private key of the intermediate certificate is utilized in signing the certificate signing request.

What is claimed is:

1. A computer-implemented method, comprising:

receiving, at an acquirer computer, a trust-verification-use-case-specific root certificate from a certificate authority of a payment processing network, the trust-verification-use-case-specific root certificate being associated with a trust verification use case;

installing, at the acquirer computer, the trust-verification-use-case-specific root certificate;

receiving, at the acquirer computer, an intermediate certificate from the certificate authority, the intermediate certificate being associated with the trust-verification-use-case-specific root certificate;

installing, at the acquirer computer, the intermediate certificate;

after installing the intermediate certificate, configuring, by the acquirer computer, the acquirer computer to use the intermediate certificate to communicate with the payment processing network by testing a network connection between the acquirer computer and the payment processing network and determining that the network connection is secure and functioning;

generating, at the acquirer computer, a key-pair-for-identity associated with an end-entity;

signing, at the acquirer computer, the key-pair-for-identity associated with the end-entity using the intermediate certificate;

generating, at the acquirer computer, a secure quick response (QR) code utilizing a digital certificate, identity information associated with the end-entity, and an associated certificate chain; and providing the secure QR code to the end-entity for scanning by a camera of a mobile device of a user to allow the mobile device to communicate with the end-entity and allow the user to provide financial compensation to the end-entity.

2. The computer-implemented method of claim 1, further comprising:

generating, at the acquirer, a certificate signing request to sign the key-pair-for-identity.

3. The computer-implemented method of claim 2, further comprising:

signing the certificate signing request utilizing an intermediate certificate private key of the intermediate certificate.

4. The computer-implemented method of claim 3, wherein:

the key-pair-for-identity includes a public key and private key with identity information associated with the end-entity.

5. The computer-implemented method of claim 4, wherein:

the digital certificate includes the public key of the end-entity, identity information of the end-entity, and a digital signature.

6. The computer-implemented method of claim 5, wherein:

the associated certificate chain includes the trust-verification-use-case-specific root certificate and the intermediate certificate.

7. The computer-implemented method of claim 6, wherein:

the end-entity is a content provider.

8. A system, comprising:

a processor; and a non-transitory computer readable medium coupled to the processor, the non-transitory computer readable medium including code that:

receives a trust-verification-use-case-specific root certificate from a certificate authority of a payment processing network, the trust-verification-use-case-specific root certificate being associated with a trust verification use case;

installs the trust-verification-use-case-specific root certificate;

receives an intermediate certificate from the certificate authority, the intermediate certificate being associated with the trust-verification-use-case-specific root certificate;

installs the intermediate certificate;

after installing the intermediate certificate, configures the processor to use the intermediate certificate to communicate with the payment processing network by testing a network connection between the processor and the payment processing network and determining that the network connection is secure and functioning;

generates a key-pair-for-identity associated with an end-entity;

signs the key-pair-for-identity associated with the end-entity using the intermediate certificate;

generates a secure quick response (QR) code utilizing a digital certificate;

identifies information associated with the end-entity, and an associated certificate chain using the secure QR code; and provides the secure QR code to the end-entity for scanning by a camera of a mobile device of a user to allow the mobile device to communicate with the end-entity and allow the user to provide financial compensation to the end-entity.

9. The system of claim 8, wherein:

the code generates a certificate signing request to sign the key-pair-for-identity.

10. The system of claim 9, wherein:

the code utilizes an intermediate certificate private key of the intermediate certificate to sign the certificate signing request.

11. The system of claim 10, wherein:

the key-pair-for-identity includes a public key and private key with identity information associated with the end-entity.

12. The system of claim 11, wherein:

the digital certificate includes the public key of the end-entity, identity information of the end-entity, and a digital signature.

13. The system of claim 12, wherein:

the associated certificate chain includes the trust-verification-use-case-specific root certificate and the intermediate certificate.

14. The system of claim 13, wherein:

the end-entity is a content provider.

* * * * *